Oct. 28, 1930.  W. H. HASLAM  1,779,470
APPARATUS FOR DRYING MOISTURE LADEN MATERIALS
Filed Oct. 19, 1928  2 Sheets-Sheet 1

Inventor,
William Heywood Haslam
By Knight Bros
attys

Oct. 28, 1930.  W. H. HASLAM  1,779,470
APPARATUS FOR DRYING MOISTURE LADEN MATERIALS
Filed Oct. 19, 1928  2 Sheets-Sheet 2

UNITED STATES PATENT OFFICE

WILLIAM HEYWOOD HASLAM, OF LONDON, ENGLAND

APPARATUS FOR DRYING MOISTURE-LADEN MATERIALS

Application filed October 19, 1928, Serial No. 313,583, and in Great Britain October 21, 1927.

This invention relates to an improved apparatus for drying moisture-laden materials. Although primarily applicable to the drying of fish or fish materials for the production of fish powder or fish meal, my invention may also be applied to the drying of other materials, for example, seaweed, shell-fish and other marine flora or to the drying of grass, beets and such like products.

It is one of the objects of the present invention to avoid the use of direct steam for sterilizing or drying the material or the use of steam-jacketed dryers for expelling the moisture. It is also a further object of my invention to avoid the use of the relatively high temperatures commonly employed heretofore in the preparation of fish meal, the known plants commonly working with temperatures of over 212° Fahr. and up to 340° Fahr. where superheated steam is employed.

Heretofore it has been usual in the manufacture of fish meal to adopt one or other of the following methods:—(1) The fish mass is sterilized by the direct application of live steam to the mass and subsequent drying at a temperature of from 212° to 340° Fahr. (2) The fish mass is dried in revolving steam-jacketed concentrators. (3) The fish mass is first cooked by the direct action of steam and then subjected to a hot air blast. In all these processes, the fish mass is cooked before drying and the fish material therefore undergoes a chemical change which destroys the collagon and gelloid structure of the flesh.

In the ordinary fish drying processes, such as in the artificial drying of salt fish, smoked fish, bloaters and kippers, the fish is either placed in trays in a tunnel drying chamber or is tentered on sticks and placed in tunnel dryers or other drying chambers, where a slow current of warm air is allowed to pass over the fish at a temperature ranging from 65° to 100° Fahr. This process is very slow and extends over several days. The temperature must not be allowed to rise above about 70° to 80° F. when the moist fish is placed in the dryers, because the air would otherwise become so heavily charged with moisture that the fish would undergo a slight chemical change in the form of semi-cooking, which would destroy the fish for the purpose for which it is intended.

As a result of these considerations, heavily saturated fish material necessitates treatment at a relatively low temperature over a prolonged period, in order to slowly extract a large percentage of the moisture before the temperature can be raised, and under hot climatic conditions it becomes commercially impossible to satisfactorily dry the fish material.

The present invention consists in a new or improved apparatus for treating and drying fish or other materials whereby it is converted into what is believed to be a new commercial product by eliminating any risk of a chemical change or cooking occurring during the drying operation and resulting in a thoroughly sterilized and perfectly dry product or powder consisting of dried uncooked fish or other material.

According to the present invention, the fish or other material is dried by subjecting it to a current of hot air circulated over or through the mass at such a velocity relative to the temperature of the air that the air does not remain long enough in the vicinity of any part of the mass to develop the conditions necessary to effect cooking of the material. By this method it is possible to effectively and rapidly sterilize and dry the mass by the use of relatively high temperature and proportionate increase of the velocity of the current of hot air without cooking the mass, so that the resulting product is obtained in a dried uncooked and sterilized form.

It is important that provision should be made for repeatedly or constantly changing the air to which the mass is subjected, in order that the air shall not become too heavily charged with moisture and that the circulation of the air over or through the mass shall be rapid enough to prevent any chemical change in the mass despite the fact that the temperature of the air is so high that under other circumstances cooking of the mass would rapidly take place. It has been found that with hot air at a temperature of approximately 170° F., the velocity of the hot air should be maintained at approximately 120 miles per hour, but this data is given as one example only. It has been found that a perfectly dry uncooked and sterilized fish powder can be obtained by subjecting the fish mass to treatment under these conditions for a period of twelve hours, but my invention is not limited to the temperature and velocity herein stated, as it has been found that the temperature of the air may be varied between approximately 70° and 170° F. or even beyond this temperature so long as the velocity of the air is maintained sufficiently high having regard to the temperature to prevent the aforesaid chemical change.

It is also important that the circulation of the hot air should be maintained constant or uninterrupted throughout the drying process, as any interruption of the hot air circulation by periods of rest would result in cooking of the product.

As one example of the manner of carrying out the invention, fish material is placed on trays carried by wagons or trucks which are run into an insulated heating chamber provided with heating elements heated by low pressure steam or hot water, and provided with circulating fans for circulating the heated air over or through the fish material, and with air outlet ducts through which the moisture-laden air is continuously withdrawn by means of an exhaust fan, the air withdrawn being replaced by fresh air entering through air ports in the heating chamber.

The drying apparatus comprises a stationary drying chamber arranged alongside of an air heating and circulating chamber which communicates at each end with the drying chamber. Provision is made in said heating chamber for circulating air through said chambers so that the air enters the drying chamber from the heating chamber at one end thereof and returns to the heating chamber at the other end of the drying chamber, the air being heated in its course through the heating chamber by the provision of heating elements therein. Two such air heating and circulating chambers may be provided, one at each side of the drying chamber, so as to circulate parallel currents of air in the same direction through the drying chamber. Provision is also made for withdrawing moistened air from the air circulating system, preferably through ports at or near the outlet end of the drying chamber.

In order that the direction of the air current through the drying chamber may be reversed, interchangeable air inlet and outlet ports are provided. For this purpose, automatically-acting air inlet ports may be provided in the heating chamber at both sides of a reversible fan or blower, the ports on the discharge side of the blower being automatically closed and those on the suction side of the blower being automatically opened by the air current produced by the blower. Air ports for the withdrawal of moistened air may be provided at or near each end of the drying chamber, the ports at either end being closed according to the direction of the air current through the drying chamber.

According to one form of the present invention, the stationary drying apparatus, the external walls of which are preferably lagged or insulated to avoid heat losses, is divided into preferably three sections side by side, the side sections containing heating elements such as steam coils or steam pipes or radiators through which steam or other hot fluid is circulated. One or more blowers are provided in each side chamber in order to draw the air in the chamber over the heating elements and deliver it to the central drying chamber at a high velocity and at a temperature ranging from about 70° to about 170° Fahr.

The material to be dried may be previously spread in thin layers upon shallow perforated trays carried by a wheeled truck which is wheeled into the central chamber through a door or doors at the end thereof, the doors being afterwards closed.

The process of drying may commence at a relatively low temperature, say about 70° Fahr., and the drying temperature may be gradually raised to a maximum of say 170° Fahr., the drying process being completed in from about four to twelve hours according to the original content of moisture in the raw material.

The fresh air may be supplied to the drying chamber either direct from the atmosphere or through an air drier. The moisture-laden air is preferably continuously withdrawn by means of an exhaust fan or like device. The moist air may be passed through air drying filters or air driers or deodorizers of any known type, such as those containing a mineral dehydrating or deodorizing agent, and the air may be discharged into the atmosphere in dry condition, thereby obviating any odours arising from the drying process.

After the drying process is completed, the heating of the drying chamber may be stopped and the dried material may be cooled by the admission of cold air from the atmosphere, after which the doors can be opened and the dried material withdrawn.

When the fresh fish material is to be dried consisting of large fishes, large heads, or bones, it may be first of all passed through a crushing machine to crush it into a kind of pulp, but in the case of small immature fish such as small whitings or haddocks, this grinding process is not absolutely necessary. The fish material may thereafter be placed in a press, which may be either a hand press or a mechanical press such as an hydraulic press, and moderate pressure may be employed to extract a proportion of the moisture in the material, but the utilization of the pressing operation and the pressure employed will depend upon the moisture content and nature of the material under treatment.

The trays may be placed above one another upon racks on the wheeled truck and the latter may, if desired, run upon rails. Any convenient number of wheeled trucks may be employed.

The stationary drying apparatus may be fitted with the necessary instruments for determining the humidity and temperature of the air in the drying chamber and suitable control apparatus may be provided for regulating the humidity and temperature as desired.

In dealing with fish or marine flora, the material may be first passed through a grinding and crushing or disintegrating mill, wherein it is crushed and torn into small pieces to increase the air surface and decrease the density of the material, which may be subsequently ground into a powder after being dried as above described.

In order that the invention may be more clearly understood, reference is hereinafter made to the accompanying drawings illustrating one construction of drying plant according to my invention by way of example.

Figure 3:
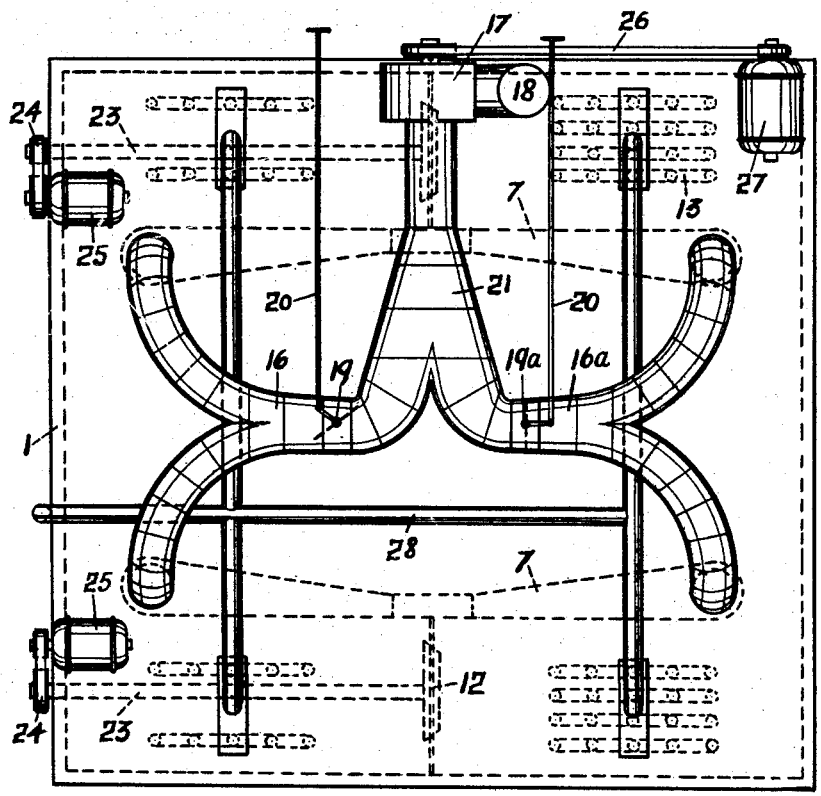
Fig. 3 is a plan view and Fig. 4 a horizontal sectional view through the plant.
Figure 1:
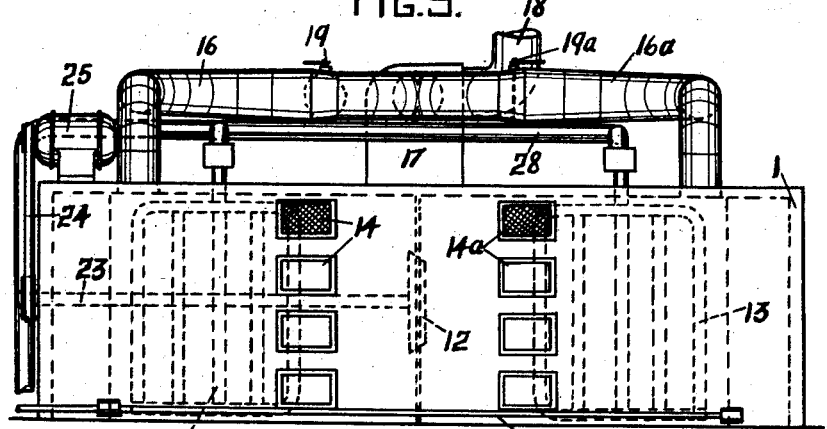
Figs. 1 and 2 are side and front views respectively of the drying plant.
Figure 5:
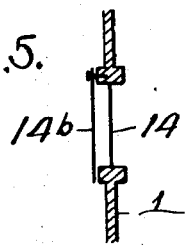
Fig. 5 is a partial sectional view of a grate opening.

Referring now to the construction illustrated, the drying plant comprises a rectangular outer casing or shell 1 preferably of insulating material, having front and rear doors 2 and 3. From front to rear of the apparatus are laid sets of rails 4 to receive wheeled trucks 5 upon which the material to be dried is supported on trays 6. Two vertical hollow partitions 7 which extend from top to bottom of the apparatus divide the apparatus into a central drying chamber 8 and side chambers 9. The hollow partitions do not extend the whole length from front to back of the apparatus, with the result that spaces 10 and 10ª connect the drying chamber 8 at each end with the side chambers 9. The side chambers 9 are provided with central transverse partitions 11 into which are fitted blowing-fans 12 for forcing the air from the side chambers 9 into the drying chamber 8 at one end thereof and for drawing the air into the side chambers 9 from the drying chamber 8 at the other end thereof. During its circulation, the air is heated in the side chambers 9 by the provision of steam or other heating pipes 13. Fresh air is admitted to the side chambers 8 through gratings 14 and 14ª fitted on the inside with flaps to close or open the gratings 14, according to the direction of rotation of the blowing fans 12. Thus it will be understood that, if the blowers are discharging towards the openings 10ª in Fig. 4, the flaps 14ᵇ shown in Fig. 5 secured to the top of and covering the gratings 14ª on the right-hand side of the partition 11 will close against the gratings, whilst the corresponding flaps on the left-hand side of the partitions will open and admit fresh air through the gratings 14 at the left-hand end of the apparatus. Any suitable type of check valve other than that above described may be provided for controlling the air inlet opening.

Figure 4:
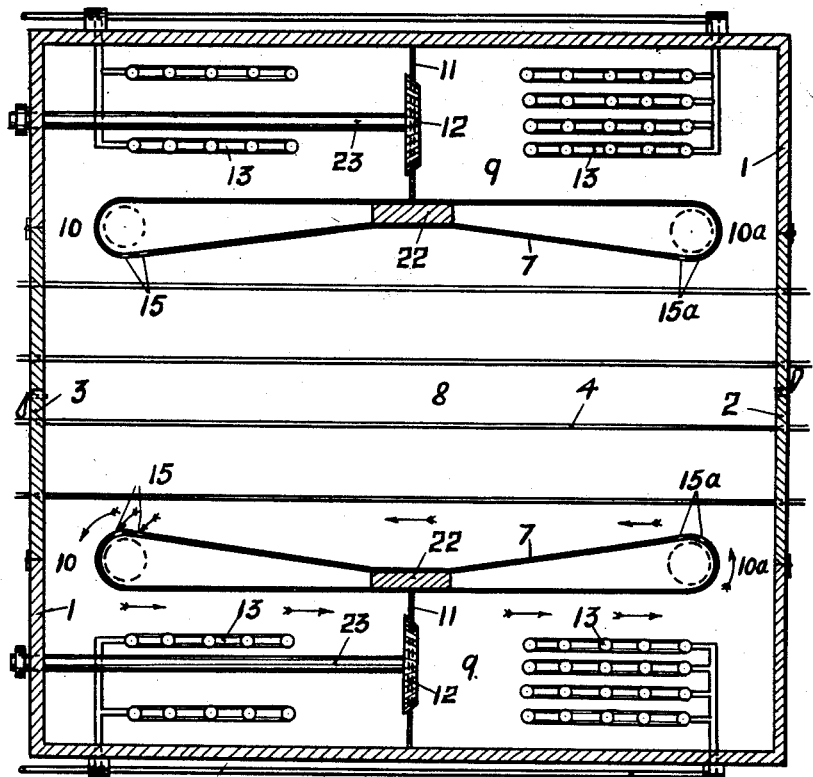
Figure 2:
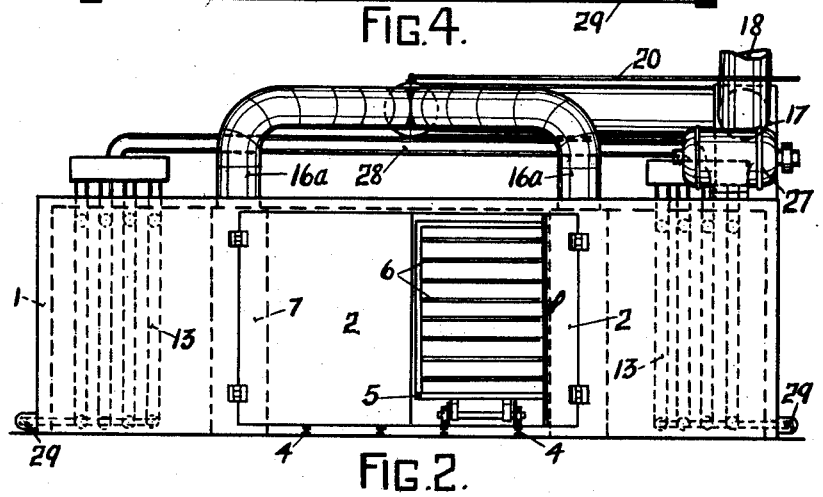

The hollow partitions 7 are provided at each end with vertical series of slots or ports 15 and 15ª and the hollow partitions communicate above with exhaust branch pipes 16 and 16ª connected to a main exhaust pipe 21 which opens into the casing of an exhaust fan 17 which discharges through an outlet pipe 18. Valves 19 and 19ª fitted in the branch exhaust pipes 16 and 16ª and controlled by rods 20 enable either pair of branch pipes to be cut-off from the exhaust fan and each hollow partition 7 is divided as shown in Fig. 4 by a central division piece 22 into two compartments.

The blowers 12 may be mounted on shafts 23 driven by belting 24 from motors 25 mounted on the top of the apparatus. The exhaust fan may be similarly driven by belting 26 from a motor 27.

The steam or other heating fluid may be supplied to the steam pipes 13 from a main steam pipe 28 and the condensed steam may be drawn off through drain pipes 29.

The method of working the apparatus is as follows:—The trucks 5 carrying the material to be dried are run into the drying chamber 8 and the doors are then closed and the side chambers 9 heated by admitting steam to the steam pipes 13. The blowers 12 are then set in motion in the same direction, e. g. so as to deliver the air through the openings 10ª to the drying chamber 8. At the same time, the valve 19ª is closed and the valve 19 opened, thereby connecting the ports 15 in the partitions 7 with the exhaust fan 17 which is also set in motion. The air will consequently circulate over the material from right to left in Fig. 4, fresh air being admitted through the gratings 14 and moist air being drawn off through the ports 15. If desired, the valve 19 may be kept closed until the air circulating in the apparatus has attained a certain degree of humidity.

The direction of the air circulation may be reversed from time to time by reversing the direction of rotation of the blowers 12 and correspondingly opening or closing the valves 19 and 19ª.

When the material has been sufficiently dried, the steam supply to the heating pipes 13 may be cut-off and the material gradually cooled by continuing the air circulation.

It will be understood that the apparatus hereinbefore described and illustrated is capable of varied modification within the scope of the invention herein set forth and that the construction illustrated is given only as an example.

Claims.

1. Drying apparatus comprising an outer shell or casing, a hollow partition partially dividing said shell or casing into a drying chamber and a heating chamber communicating with one another at their ends over said partition, heating elements in said heating chamber, means for circulating air from the heating chamber into the drying chamber at one end thereof and from the other end of the drying chamber back into the heating chamber, air inlet ports for supplying fresh air to the circulating current of air, and ports in said partition for drawing off moistened air from said current of air.

2. Drying apparatus as claimed in claim 1 in which the hollow partition is divided into two compartments each provided with outlet ports communicating with valve-controlled exhaust pipes, substantially as described.

The foregoing specification signed at London this first day of October, 1928.

WILLIAM HEYWOOD HASLAM.